No. 847,568. PATENTED MAR. 19, 1907.
M. P. GERBING.
FENDER FOR HARVESTERS.
APPLICATION FILED FEB. 13, 1906.
4 SHEETS—SHEET 1.
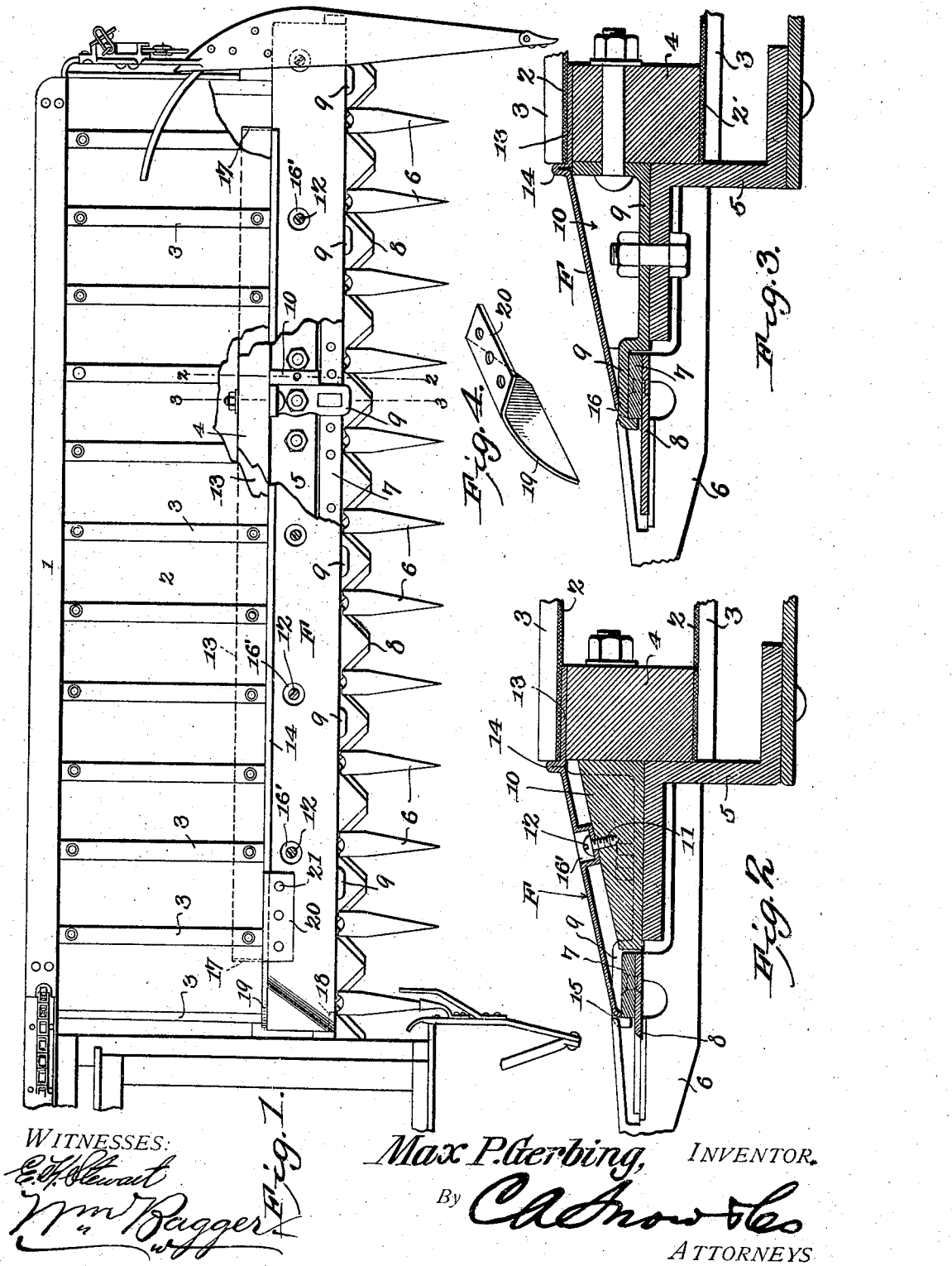
WITNESSES:
Max P. Gerbing, INVENTOR.
By C. A. Snow & Co.
ATTORNEYS No. 847,568. PATENTED MAR. 19, 1907.
M. P. GERBING.
FENDER FOR HARVESTERS.
APPLICATION FILED FEB. 13, 1906.
4 SHEETS—SHEET 2.
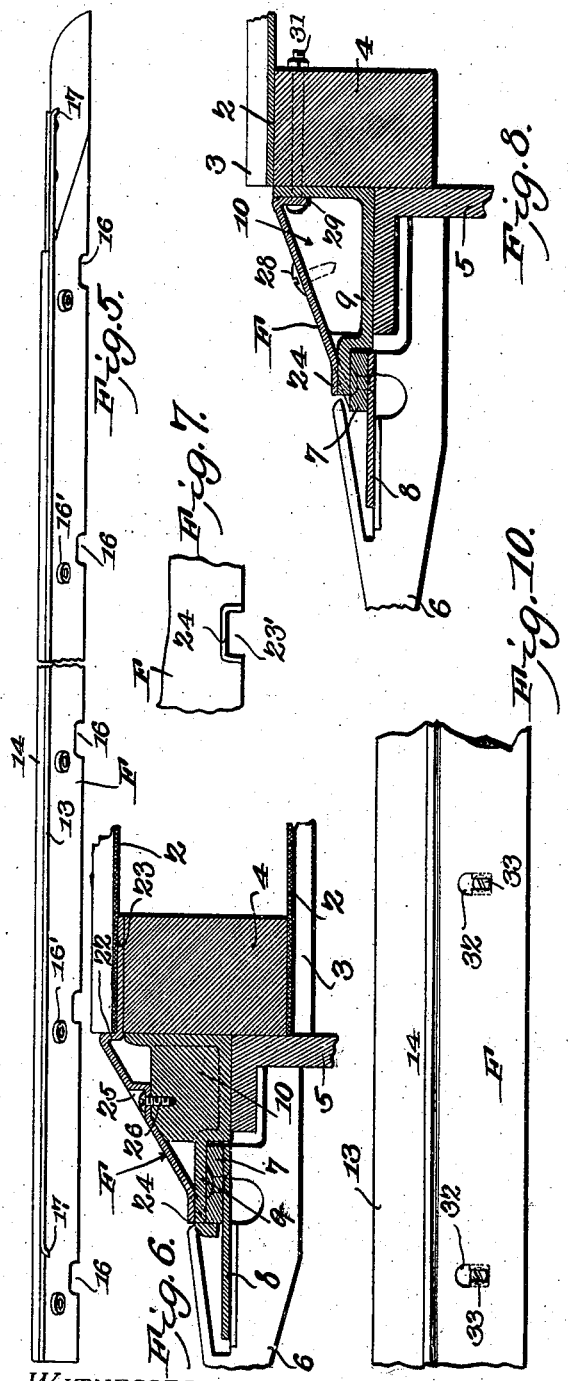
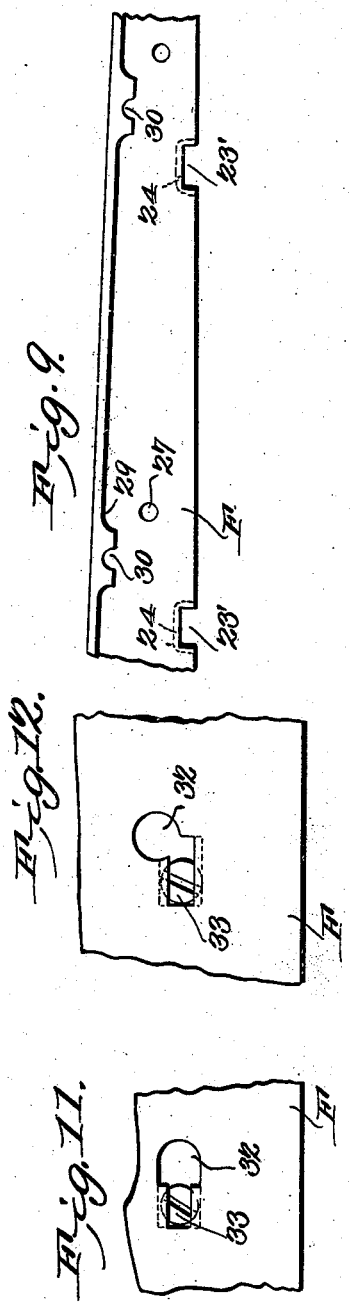
WITNESSES:
Max P. Gerbing,
INVENTOR.
By C. A. Snow & Co.
ATTORNEYS No. 847,568. PATENTED MAR. 19, 1907.
M. P. GERBING.
FENDER FOR HARVESTERS.
APPLICATION FILED FEB. 13, 1906.
4 SHEETS—SHEET 3.
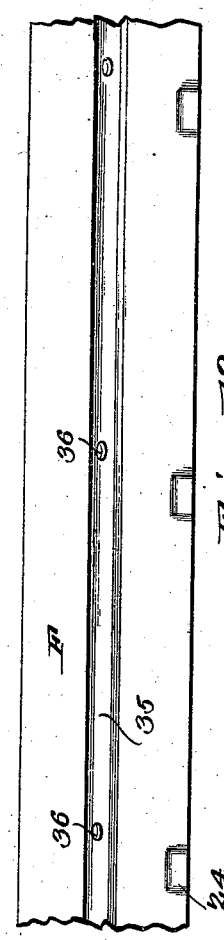
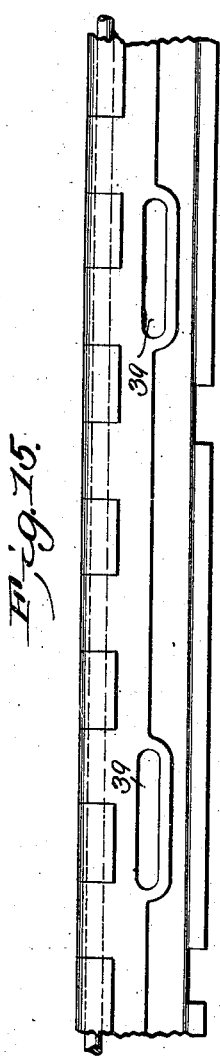
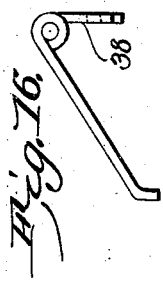
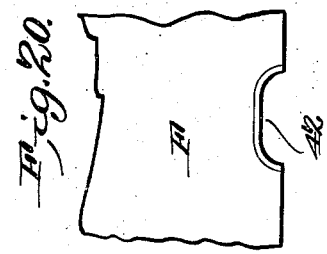
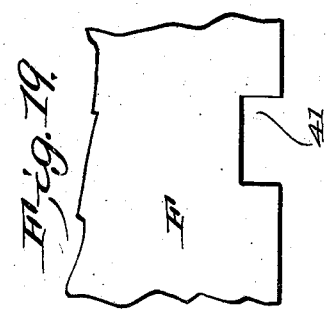
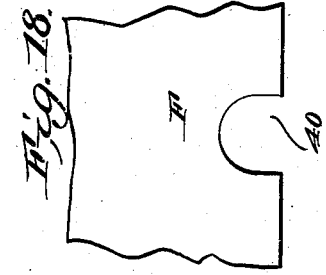
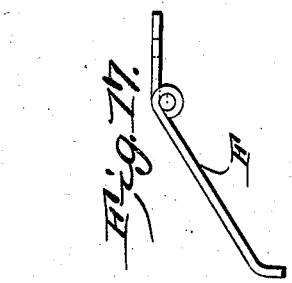
WITNESSES:
E. F. Stewart
Wm. Bagger
Max P. Gerbing,
INVENTOR.
By C. A. Snow & Co
ATTORNEYS
THE NORRIS PETERS CO., WASHINGTON, D. C.

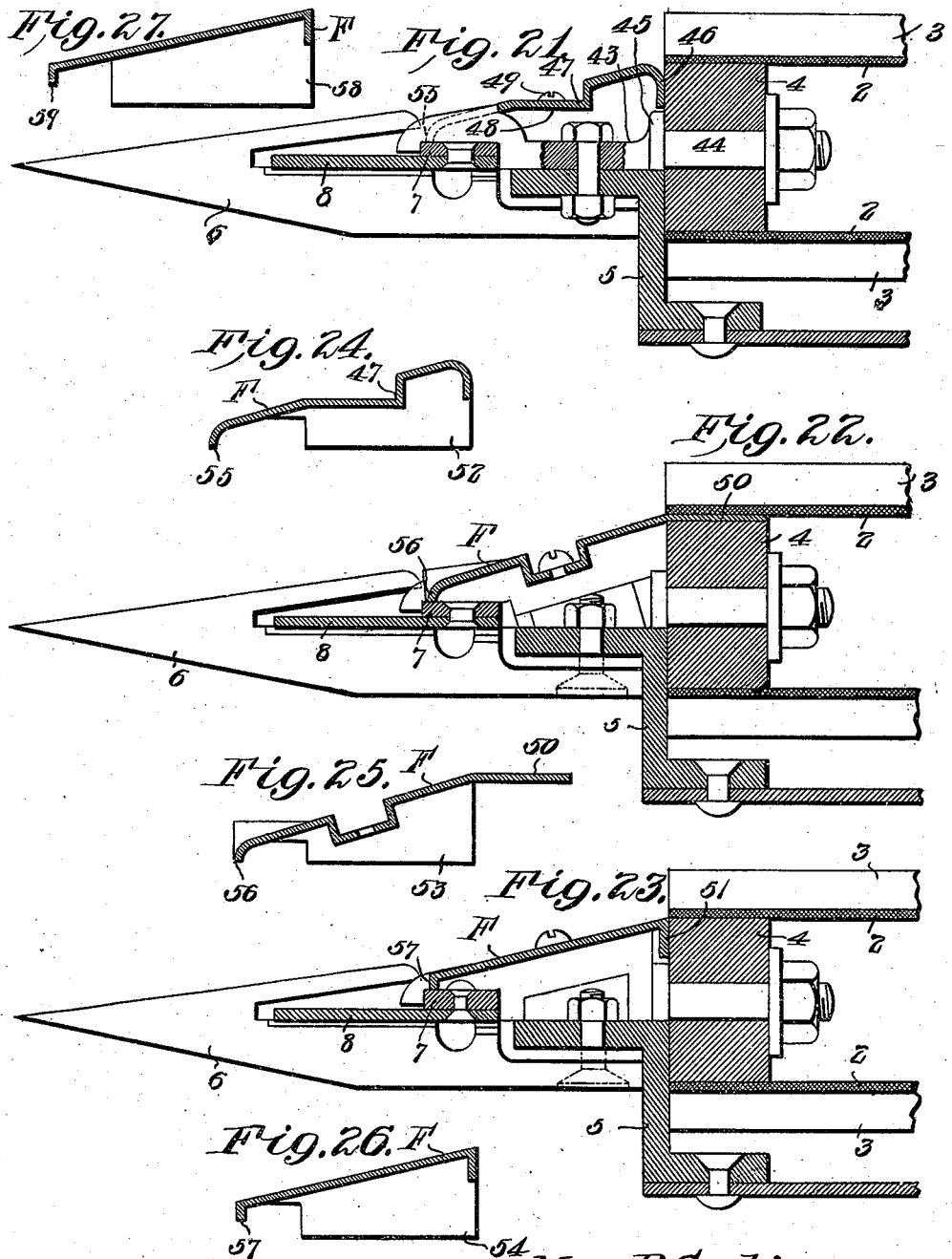

UNITED STATES PATENT OFFICE.

MAX P. GERBING, OF WENTWORTH, MISSOURI.

FENDER FOR HARVESTERS.

No. 847,568.　　　　Specification of Letters Patent.　　　　Patented March 19, 1907.

Application filed February 13, 1906. Serial No. 300,909.

*To all whom it may concern:*

Be it known that I, MAX P. GERBING, a citizen of the United States, residing at Wentworth, in the county of Newton and State of Missouri, have invented a new and useful Fender for Harvesters, of which the following is a specification.

This invention relates to fenders for the cutting apparatus of self-binding harvesters;
and it has for its object to overcome certain disadvantages which are now frequently experienced in the use of machines of this class, especially when the grain that is operated upon is tangled, matted, or beaten down.
When grain of this character is operated upon by machines of ordinary construction, it frequently happens that the straws become tangled in the cutting apparatus, seriously obstructing the operation of the same, so that much grain is frequently permitted to drag under the machine without being cut thereby, and thus entailing a considerable loss, not only on account of the grain that is lost, but also on account of the time consumed in stopping the machine and removing the tangled straw from the cutting apparatus.

By the present invention a fender of simple and improved construction is provided, whereby the cutting apparatus is guarded, so as to prevent straws from becoming tangled therein, and the objections above referred to are obviated.

Other objects of the invention are to simplify and improve the construction and operation of this class of devices.

With these and other ends in view, which will readily appear as the nature of the invention is better understood, the same consists in the improved construction and novel arrangement and combination of parts, which will be hereinafter fully described, and particularly pointed out in the claims.

In the accompanying drawings, Figure 1 is a top plan view of a binder-platform equipped with a preferred form of the invention. Fig. 2 is a sectional view taken on the plane indicated by the line 2 2 in Fig. 1. Fig. 3 is a sectional view taken on the plane indicated by the line 3 3 in Fig. 1. Fig. 4 is a perspective view of a separate member or shield used in connection with the fender. Fig. 5 is a rear elevation showing the fender detached. Fig. 6 is a vertical sectional view taken through a cutter-bar and related parts and illustrating a modified form of the fender. Fig. 7 is a detail front elevation of a small portion of the fender illustrated in Fig. 6. Fig. 8 is a vertical sectional view taken through a cutter-bar and related parts and illustrating another modified form of the fender. Fig. 9 is a rear elevation of a portion of the form of fender illustrated in Fig. 8. Fig. 10 is a detail plan view of a portion of a fender, illustrating a modified form of attaching means for the same. Figs. 11 and 12 are detail plan views of small portions of fenders, illustrating further modifications in the form of attaching means. Fig. 13 is a plan view illustrating a further modification in the form of the fender. Fig. 14 is a sectional detail view of the form of fender shown in Fig. 13. Fig. 15 is a detail rear view illustrating a further modification in the form of the fender. Fig. 16 is an end elevation of the form of fender illustrated in Fig. 15. Fig. 17 is an end elevation of a fender similar to the one illustrated in Fig. 15, but illustrating a different method of applying the same. Figs. 18, 19, and 20 are detail front views of small portions of fenders, showing the same provided with differently-formed notches adapted for the reception of differently-constructed sickle-straps. Figs. 21, 22, and 23 are sectional views of various cutting apparatuses equipped with various forms of the improved fender. Figs. 24, 25, and 26 are cross-sectional views of the fenders shown in Figs. 21, 22, and 23 detached. Fig. 27 is a cross-sectional view of a fender, illustrating a further modification.

Corresponding parts in the several figures are indicated throughout by similar characters of reference.

1 designates a harvester-platform; 2, the endless apron or conveyer upon said platform; 3 3 the slats of the apron or conveyer; 4, the front frame-bar or roller-bar; and 5, the angle-bar, which constitutes the fingerbar and which carries the fingers 6 6. The sickle-bar or cutter-bar is shown at 7, said bar having the cutters 8, and said cutter-bar, which is mounted for reciprocation in the usual manner, is guided and held in position by means of the sickle-straps 9. All of these parts are of the usual or any well-known or approved construction.

The fender which constitutes the present invention in its several forms is preferably constructed of sheet metal, from which it may be conveniently manufactured at small expense. Said fender, which is generally designated by the character F, may be generally described as consisting of a strip of sheet metal of suitable dimensions to extend over the full length of the cutting apparatus and to cover the cutter-bar and the exposed portion of the finger-bar, forming a smooth and plain surface free from obstructions of any kind in which straws would be apt to become fastened and tangled and serving, in short, as a cover for the sickle-straps and for the numerous bolts and nuts used in joining the several parts of the cutting apparatus together.

Adjacent to the sickle-straps and preferably integral therewith are lugs, as 10, having threaded recesses 11, adapted to receive the points of machine-screws 12, whereby the fender may be mounted in position for operation.

In the form of the fender illustrated in Figs. 1, 2, 3, 4, and 5 of the drawings the fender is provided with a rearwardly-extending flange 13, lying flat upon the upper side of the frame-bar or roller-guard 4 beneath the apron 2, and between the flange 13 and the body of the fender there is formed a longitudinal rib or bead 14, forming a guide for the front edge of the apron. The front edge of the body of the fender is provided with a downturned flange 15, engaging the upper side of the cutter-bar, and said flange is provided with notches 16 (best seen in Fig. 5 of the drawings) for the accommodation of the projecting forward extremities of the sickle-straps 9. The body of the fender is provided with countersunk recesses 16' for the accommodation of the heads of the screws 12. The flange 13 does not extend the full length of the fender but is provided with downturned ends 17, adapted to fit against the extremities of the endless apron or conveyer 2. The body of the fender is made of such a shape as to fit neatly over the cutting apparatus and at its inner front corner is formed a notch 18 (shown in dotted lines in Fig. 1) for the accommodation of the thickened portion of the sickle-bar—that is to say, the portion of the sickle-bar having the usual hinge connection with the operating pitman—which parts, however, are not shown in the drawings. Secured at the inner rear corner of the fender is a shield 19, having a flange 20 for the reception of bolts or rivets, as 21, whereby it may be secured upon the fender, said shield being for the purpose of forming a closure for the rear side of the inner end of the fender, so as to prevent the apron 2 from becoming caught in or entangled with the latter at the point where said apron passes over its inner supporting-roller, the "inner" being preferable to the end where the platform is connected with the body of the harvesting-machine. It is to be understood that the shield 19 may be of any suitable shape or form and that it may be mounted upon or connected with the fender in any suitable manner. Said shield may also, if preferred, be connected with the frame-bar or roller-guard 4.

Under the construction illustrated in Fig. 6 of the drawings the fender presents a greater incline than in the five preceding figures, and it is provided with a shoulder or offset 22, separating it from the horizontal flange (here designated 23) which extends over the top of the frame-bar 4, the shoulder 22 constituting a guide-rib for the front edge of the apron. The sickle-bar notches (here designated 23' and best seen in Fig. 7) are provided with struck-up portions forming hoods, as 24, lying flat on top of the sickle-bars, and the fender has here been shown as provided with a continuous longitudinal offset forming a groove 25, at the bottom of which apertures are formed for the passage of the fastening-screws, one of which appears at 26.

Under the modification illustrated in Figs. 8 and 9 the fender-bar is tapered longitudinally, as will be best seen in Fig. 9, and the perforations or apertures 27 for the passage of the fastening-screws 28 are not countersunk, leaving the heads of the screws exposed upon the upper side of the fender. In the form here illustrated the horizontal flange extending over the frame-bar 4 is dispensed with and the body of the fender is provided at its upper or rear edge with a downturned flange, as 29, provided at intervals with notches 30, adapted to straddle bolts, as 31, that extend horizontally through the frame-bar 4 and whereby the fender may be connected detachably with said frame-bar.

In Fig. 10 of the drawings the fender is provided with keyhole-slots 32, adapted to engage screw-heads 33, whereby it may be secured in position and which will enable the fender to be detached and replaced by simply loosening the screws without removing the latter. Modified forms of keyhole-slots are illustrated in Figs. 11 and 12.

Figs. 13 and 14 illustrate a form of fender which is provided with a longitudinal groove 35, the bottom of which has apertures 36 for the reception of the fastening-screws. This form of fender has also been shown provided at its rear edge with a depending flange 37 for the passage of bolts, whereby it may be mounted in position upon the front side of the roller-guard. It will be observed that the flange 37, as best seen in Fig. 14, forms a sharp angle with the body of the fender, while the flange 29 (seen in Fig. 8) is curved or rounded at the point where it joins the body of the fender.

Under the modification seen in Figs. 15, 16, and 17 the fender is hingedly connected with a flange 38, which is apertured for the reception of securing-bolts. This flange may be secured to the front side of the roller-guard, as shown in Fig. 16, or to the upper side of the roller-guard, as shown in Fig. 17. The fender, as best seen in Fig. 15, is provided with slots 39 for the passage of fastening-screws.

Figs. 18, 19, and 20 show portions of fenders provided with notches 40, 41, and 42 of different sizes and shapes for the accommodation of sickle-straps of various shapes and sizes.

In Fig. 21 the fender-supporting lug (here designated 43) is formed with an integral bolt 44, adapted to extend through the front frame-bar 4, said bolt being also provided with a shoulder 45, abutting upon the front side of said frame-bar. The fender F is here provided with a downturned rear edge 46, adapted to engage and to be supported upon the shoulders 45 of a plurality of the bolts. Said fender is also provided with a longitudinal inset portion or recess 47, engaging corresponding recesses 48 in the lugs 43, with which the fender is connected, as by means of machine-screws 49. In Figs. 22 and 25 the fender F has been shown as provided with a flange portion 50, adapted to rest upon the upper side of the frame-bar 4. In Figs. 23 and 26 the fender F has been shown provided with a depending rear flange 51 engaging the front side of the frame-bar 4. The several forms of the fenders shown in Figs. 24, 25, and 26 are provided with end flanges 52, 53, and 54, the lower edges of which are level with the lower edges of the downturned sickle-bar engaging flanges 55, 56, and 57 at the front edges of said fenders. In Fig. 27 still another modification is shown in which the end flange (here designated 58) is extended below the level of the front flange 59. These modifications are at times required for special forms of cutting apparatus.

The modifications herein enumerated are but a few of those which may be legitimately resorted to within the scope of the invention.

The application of the improved fender to harvesting-machines of various makes renders it necessary to adapt the construction of the fender to the particular machine upon which it is to be fitted, and it is obvious that any needed changes may be made whenever desired.

Having thus described the invention, what is claimed is—

1. A harvester having a cutting apparatus, a fender applied to the finger-bar thereof and extending in an upwardly and rearwardly inclined position from the same, said fender having at its rear edge a horizontal portion resting on the frame of the harvester, an apron carried by the harvester and resting upon said horizontal portion.

2. A harvester having a cutting apparatus, a fender applied to the finger-bar thereof and consisting of a plate extending from said finger-bar and having an upwardly-extending rib, an apron carried by the harvester and guided by said rib.

3. A harvester having a cutting apparatus, a fender applied to the finger-bar thereof, and consisting of a plate having an upwardly-extending rib and a rearwardly-extending portion, an apron carried by the harvester and resting upon the rearwardly-extending portion and guided by the rib.

4. A harvester having a cutting apparatus, a fender applied to the finger-bar thereof and consisting of a plate extending over the said bar and having notches, sickle-bar clips located in said notches, said notches having horizontal hoods located at their edges.

In testimony that I claim the foregoing as my own I have hereto affixed my signature in the presence of two witnesses.

MAX P. GERBING.

Witnesses:
CLEM AUFFERT,
A. I. EISMER.